(12) United States Patent
Sadamitsu et al.

(10) Patent No.: US 8,940,059 B2
(45) Date of Patent: Jan. 27, 2015

(54) AZO COMPOUND AND DYE POLARIZING FILM CONTAINING THE SAME

(75) Inventors: Yuichi Sadamitsu, Tokyo (JP); Takahiro Higeta, Tokyo (JP)

(73) Assignees: Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 923 days.

(21) Appl. No.: 12/974,581

(22) Filed: Dec. 21, 2010

(65) Prior Publication Data

US 2011/0089383 A1    Apr. 21, 2011

Related U.S. Application Data

(62) Division of application No. 12/308,282, filed as application No. PCT/JP2007/062509 on Jun. 21, 2007, now abandoned.

(30) Foreign Application Priority Data

Jun. 22, 2006    (JP) .................................. 2006-172292

(51) Int. Cl.
| | | |
|---|---|---|
| C09B 31/30 | (2006.01) | |
| G02B 5/30 | (2006.01) | |
| C09B 31/22 | (2006.01) | |
| C09B 31/08 | (2006.01) | |
| C09B 45/28 | (2006.01) | |
| C09B 56/08 | (2006.01) | |

(52) U.S. Cl.
CPC ................. *C09B 31/22* (2013.01); *C09B 31/08* (2013.01); *C09B 45/28* (2013.01); *C09B 56/08* (2013.01); *G02B 5/3033* (2013.01)
USPC ................ 8/662; 8/459; 8/506; 8/648; 8/664; 8/681; 8/687; 252/582; 252/585; 534/573; 534/689; 534/704; 428/1.31

(58) Field of Classification Search
USPC .......... 252/500–585; 428/1.31; 534/577, 573, 534/689, 704; 8/459, 506, 648, 664, 681, 8/687
See application file for complete search history.

(56) References Cited

U.S. PATENT DOCUMENTS

| | | | |
|---|---|---|---|
| 2,004,250 A | 6/1935 | Schindhelm et al. | |
| 2,270,451 A | 1/1942 | Keller | |
| 2,671,775 A | 3/1954 | Hanhart et al. | |
| 2,817,659 A | 12/1957 | Bossard et al. | |
| 4,051,123 A | 9/1977 | Piller et al. | |
| 4,118,232 A | 10/1978 | Piller et al. | |
| 4,556,707 A | 12/1985 | Henk | |
| 4,954,133 A | 9/1990 | Oppliger | |
| 5,007,942 A | 4/1991 | Claussen et al. | |
| 5,272,259 A | 12/1993 | Claussen et al. | |
| 5,318,856 A | 6/1994 | Misawa et al. | |
| 5,446,135 A | 8/1995 | Misawa et al. | |
| 5,700,296 A | 12/1997 | Ogino et al. | |
| 5,731,421 A | 3/1998 | Tzikas et al. | |
| 5,739,298 A | 4/1998 | Misawa et al. | |
| 6,049,428 A | 4/2000 | Khan et al. | |
| 6,143,062 A | 11/2000 | Miyazawa et al. | |
| 6,399,752 B1 | 6/2002 | Ohta et al. | |
| 6,552,849 B1 | 4/2003 | Furuhashi et al. | |
| 6,563,640 B1 | 5/2003 | Ignatov et al. | |
| 6,699,976 B2 | 3/2004 | Ashida et al. | |
| 6,790,490 B1 | 9/2004 | Oiso et al. | |
| 7,245,431 B2 | 7/2007 | Watson et al. | |

(Continued)

FOREIGN PATENT DOCUMENTS

| | | |
|---|---|---|
| CN | 1220683 A | 6/1999 |
| CN | 1331807 A | 1/2002 |

(Continued)

OTHER PUBLICATIONS

Office Action mailed Dec. 6, 2012 in co-pending U.S. Appl. No. 12/993,643.
Office Action mailed Dec. 12, 2012 in co-pending U.S. Appl. No. 12/999,447.
English Translation of Chinese Communication issued Oct. 31, 2012 in co-pending Chinese Patent Application No. 200980118425.X.
International Search Report dated Sep. 11, 2007 in co-pending foreign application PCT/JP2007/061813.
International Search Report dated Sep. 11, 2007 in corresponding foreign application PCT/JP2007/062509.

(Continued)

*Primary Examiner* — Tri V Nguyen
(74) *Attorney, Agent, or Firm* — Nields, Lemack & Frame, LLC

(57) ABSTRACT

Disclosed is an azo compound represented by the formula (1) below, a salt thereof, or a copper complex salt compound thereof.

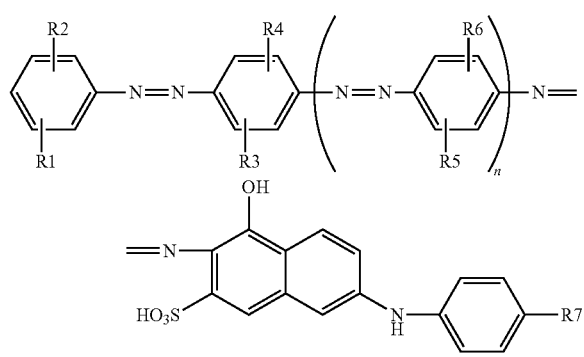

(In the formula, R1 and R2 independently represent a hydrogen atom, a sulfonic acid group, a lower alkyl group or a lower alkoxyl group; R3-R6 independently represent a hydrogen atom, a lower alkyl group or a lower alkoxyl group; R7 represents a lower alkyl group or a lower alkoxyl group; and n represents 0 or 1.)

13 Claims, No Drawings

(56) References Cited

U.S. PATENT DOCUMENTS

| | | |
|---|---|---|
| 7,304,147 B2 | 12/2007 | Sadamitsu et al. |
| 7,387,668 B2 | 6/2008 | Kitayama et al. |
| 7,445,822 B2 | 11/2008 | Sadamitsu |
| 7,514,129 B2 | 4/2009 | Sadamitsu |
| 7,931,702 B2 | 4/2011 | Sadamitsu et al. |
| 8,232,375 B2 | 7/2012 | Higeta et al. |
| 8,389,122 B2 | 3/2013 | Sadamitsu et al. |
| 8,389,124 B2 | 3/2013 | Sadamitsu et al. |
| 8,477,268 B2 | 7/2013 | Nishiguchi et al. |
| 8,643,809 B2 | 2/2014 | Sadamitsu et al. |
| 2003/0090012 A1 | 5/2003 | Allen et al. |
| 2003/0098447 A1 | 5/2003 | Ashida et al. |
| 2004/0218118 A1 | 11/2004 | Hayashi |
| 2004/0232394 A1 | 11/2004 | Khan et al. |
| 2005/0003109 A1 | 1/2005 | Oiso et al. |
| 2007/0079740 A1 | 4/2007 | Sadamitsu et al. |
| 2007/0119341 A1 | 5/2007 | Kitayama et al. |
| 2007/0166483 A1 | 7/2007 | Sadamitsu |
| 2007/0287830 A1* | 12/2007 | Sano et al. .......... 534/730 |
| 2008/0094549 A1 | 4/2008 | Sadamitsu |
| 2008/0193660 A1 | 8/2008 | Matsui et al. |
| 2009/0174942 A1 | 7/2009 | Sadamitsu et al. |
| 2010/0226008 A1 | 9/2010 | Higeta et al. |
| 2010/0257678 A1 | 10/2010 | Sadamitsu et al. |
| 2011/0060134 A1 | 3/2011 | Sadamitsu et al. |
| 2011/0063546 A1 | 3/2011 | Sadamitsu et al. |
| 2011/0075076 A1 | 3/2011 | Nishiguchi et al. |
| 2011/0164208 A1 | 7/2011 | Nishiguchi et al. |
| 2011/0267691 A1 | 11/2011 | Sadamitsu et al. |
| 2014/0029099 A1 | 1/2014 | Sadamitsu et al. |

FOREIGN PATENT DOCUMENTS

| | | |
|---|---|---|
| CN | 1523375 A | 8/2004 |
| CN | 1774480 A | 5/2006 |
| CN | 1914283 A | 2/2007 |
| DE | 1644179 B | 7/1971 |
| DE | 3236238 A1 | 5/1984 |
| EP | 0146747 A2 | 7/1985 |
| EP | 0530106 A1 | 3/1993 |
| EP | 0549342 A2 | 6/1993 |
| EP | 0626598 A2 | 11/1994 |
| EP | 0632105 A1 | 1/1995 |
| EP | 0982371 A1 | 3/2000 |
| EP | 1203969 A1 | 5/2002 |
| EP | 1614719 A1 | 1/2006 |
| FR | 1541972 A | 10/1968 |
| GB | 954100 B | 4/1964 |
| JP | 47-018548 B1 | 5/1972 |
| JP | 58-145761 A | 8/1983 |
| JP | 60-115671 A | 6/1985 |
| JP | 60-156759 A | 8/1985 |
| JP | 60-168743 A | 9/1985 |
| JP | 60-243157 A | 12/1985 |
| JP | 60-243176 A | 12/1985 |
| JP | 2-269136 A | 11/1990 |
| JP | 3-12606 A | 1/1991 |
| JP | 5-295281 A | 11/1993 |
| JP | 2622748 B2 | 4/1997 |
| JP | 2001-33627 A | 2/2001 |
| JP | 2001-56412 A | 2/2001 |
| JP | 2001-108828 A | 4/2001 |
| JP | 2001-240762 A | 9/2001 |
| JP | 2002-275381 A | 9/2002 |
| JP | 2003-35819 A | 2/2003 |
| JP | 2003-215338 A | 7/2003 |
| JP | 2004-51645 A | 2/2004 |
| JP | 2004-75719 A | 3/2004 |
| JP | 2004-323712 A | 11/2004 |
| JP | 2004-338876 A | 12/2004 |
| RU | 2110822 C1 | 5/1998 |
| RU | 2155978 C2 | 9/2000 |
| WO | 2004/013232 A1 | 2/2004 |
| WO | 2004/092282 A1 | 10/2004 |
| WO | 2005/033211 A1 | 4/2005 |
| WO | 2005/075572 A1 | 8/2005 |
| WO | 2006/051850 A1 | 5/2006 |
| WO | 2006/057214 A1 | 6/2006 |
| WO | 2007/145210 A1 | 12/2007 |
| WO | 2007/148757 A1 | 12/2007 |

OTHER PUBLICATIONS

European Communication dated Jul. 28, 2009 in co-pending foreign application PCT/JP2007/061813.

European Communication dated Jul. 28, 2009 in corresponding foreign application PCT/JP2007/062509.

European Communication dated May 7, 2010 in corresponding foreign application EP 10151418.0.

"Senryo Kagaku (Dye Chemistry)", with English translation, First Edition printing Nov. 30, 1957, Fourth Edition printing Aug. 15, 1966, pp. 611-613, by Yutaka Hosada.

Russian Communication dated Nov. 3, 2010 in corresponding foreign application (RU2009101945).

Office Action dated Sep. 30, 2010 in corresponding U.S. Appl. No. 12/308,282.

Final Rejection mailed Feb. 8, 2012 in co-pending U.S. Appl. No. 13/181,743.

Final Rejection mailed Feb. 9, 2012 in co-pending U.S. Appl. No. 12/227,994.

Final Rejection mailed Jun. 10, 2013 in co-pending U.S. Appl. No. 12/993,643.

Notice of Allowance mailed Apr. 29, 2013 in co-pending U.S. Appl. No. 12/999,447, now US Patent No. 8,477,268.

Notice of Allowance mailed Jun. 4, 2012 in co-pending U.S. Appl. No. 12/739,210.

Japanese communication issued Oct. 8, 2013 in corresponding Japanese Patent Application No. JP 2012-243760.

Partial English translation of Japanese Office Action issued Oct. 8, 2013 in corresponding Japanese Patent Application No. JP 2012-243760.

Notice of Allowance mailed Oct. 18, 2013 in co-pending U.S. Appl. No. 12/948,395.

Office Action mailed Nov. 6, 2013 in co-pending U.S. Appl. No. 12/948,404.

Office Action dated Aug. 11, 2011 in co-pending U.S. Appl. No. 12/227,994.

Office Action dated Aug. 12, 2011 in co-pending U.S. Appl. No. 13/181,743.

EPO Machine Translation of FR 1541972, Farbenfabriken Bayer; Colorants Disazoiques, Oct. 26, 1967.

Senryo Kagaku (Dye Chemistry), with English Translations, 1st Edition Nov. 30, 1957, 4th Edition Aug. 15, 1966, pp. 618-619 and 634-635.

Senryo Kagaku (Dye Chemistry), with English Translations, 1st Edition Nov. 30, 1957, 4th Edition Aug. 15, 1966, p. 626.

Thieme, vol. 10/3, Part 3 (1952), pp. 339-346, XP 002536512, "Methoden der Organischen Chemie", Houben, et al.

J. Chem. Soc. Pak, vol. 24, No. 1, (2002), pp. 10-17, "Stilbene Based Direct Effect of Fixing Agents on the Fastness and Colour Properties", Waheed, et al.

International Search Report dated Jun. 26, 2007 in co-pending foreign application No. PCT/JP2007/060623.

European Communication dated Oct. 12, 2009 in co-pending foreign application No. PCT/JP2007/060623.

Russian Communication dated Feb. 12, 2011 in co-pending foreign application No. RU 2008152360/05.

International Search Report dated Dec. 9, 2008 in co-pending foreign application No. PCT/JP2008/069723.

International Search Report dated Aug. 4, 2009 in co-pending foreign application No. PCT/JP2009/059173.

International Search Report dated Aug. 4, 2009 in co-pending foreign application No. PCT/JP2009/059172.

Office Action dated Nov. 4, 2010 in co-pending U.S. Appl. No. 12/227,613.

(56) References Cited

OTHER PUBLICATIONS

Notice of Allowance dated Dec. 15, 2010 in co-pending U.S. Appl. No. 12/227,613.
Final Rejection dated Mar. 17, 2011 in co-pending U.S. Appl. No. 12/308,282.
Chineses Communication issued Oct. 31, 2012 in co-pending Chinese Patent Application No. 200980118425.X.
Notice of Allowance mailed Nov. 16, 2012 in co-pending U.S. Appl. No. 12/227,994.
Notice of Allowance mailed Nov. 15, 2012 in co-pending U.S. Appl. No. 13/181,743.
Japanses Communication with English translation, issued Apr. 27, 2012 and mailed May 8, 2012, in co-pending Japanese Patent Application No. JP 2008-517886.
Chineses Communication, with English translation, issued Nov. 19, 2012 in co-pending Chinese Patent Application No. CN 200980122710.9.
Office Action mailed Jul. 16, 2014 in co-pending U.S. Appl. No. 12/993,643.
Notice of Allowance mailed Mar. 7, 2014 in co-pending U.S. Appl. No. 12/948,404.
Miscellaneous communication mailed Apr. 2, 2014 in co-pending U.S. Appl. No. 12/948,404.

* cited by examiner

AZO COMPOUND AND DYE POLARIZING FILM CONTAINING THE SAME

This application is a divisional of U.S. patent application Ser. No. 12/308,282 filed Dec. 11, 2008, which is a 371 of PCT/JP2007/062509 filed Jun. 21, 2007, the disclosures of which are incorporated herein by reference.

TECHNICAL FIELD

The present invention relates to a novel azo compound, a salt thereof or a copper complex salt compound thereof and a dye-containing polarizing film containing the same.

BACKGROUND ART

A polarizing plate having a function to transmit or shield light is a fundamental constituent element of a display device such as a liquid crystal display (LCD), along with liquid crystals which have a function of switching light. The area of application of this LCD has expanded broadly from small items such as an electronic calculator, a watch, and the like in the early day to a notebook computer, a word processor, a liquid crystal projector, a liquid crystal television, a car navigation system, indoor and outdoor measurement instruments, and the like. Also, the LCD is used in broad conditions from low to high temperature, from low to high humidity, and from low to high light intensity. Thus, a polarizing plate having high polarizing performance and excellent durability is desired.

At present, a polarizing film is manufactured by dyeing a polarizing film substrate with or incorporating therein iodine or a dichromatic dye as a polarizing element, wherein the substrate is a stretched and oriented film of polyvinyl alcohol or its derivative, or an oriented film of polyene prepared by dehydrochlorination of a polyvinyl chloride film or dehydration of a polyvinyl alcohol film. Among these, an iodine polarizing film which uses iodine as the polarizing element exhibits superior initial polarizing performance. On the other hand, this polarizing film is weak to moisture and heat, and when it is used for a long time under conditions of high temperature and high humidity, there arises a problem of durability. In order to improve durability, methods such as treatment of a polarizing film with formalin or an aqueous solution containing boric acid, use of a polymer film of low moisture permeability as a protective film, and the like are considered. However, the effects of these methods are not satisfactory. On the other hand, a dye-containing polarizing film comprising a dichromatic dye as a polarizing element has better humidity resistance and heat resistance than an iodine polarizing film, but, generally, initial polarizing performance of the dye-containing polarizing element is insufficient.

In a neutral color polarizing film produced by adsorbing several dichromatic dyes to a polymer film followed by orientation, if there is light leakage (color leakage) of a specific wavelength in the wavelength range of visible light, in a state (the perpendicular position) that two polarizing films are superimposed on each other in such a way that their orientation directions are perpendicular to each other, the hues of the liquid crystal display may change in the dark state when the polarizing films are fitted to the liquid crystal display panel. Thus, in order to prevent the color change of a liquid crystal display due to color leakage of a specific wavelength in the dark state when a polarizing film is fitted to a liquid crystal display device, it is necessary to uniformly lower the average light transmittance at the perpendicular position (perpendicular average light transmittance) in the wavelength range of visible light.

Further, in a case of a color liquid crystal projection display, namely, a color liquid crystal projector, a polarizing plate is used for a liquid crystal image-forming part. In this application, the iodine polarizing plate was used formerly, which has good polarization performance and exhibits neutral gray color. However, as mentioned above, the iodine polarizing plate has a problem that its light resistance, heat resistance, and wet heat resistance are insufficient, because iodine is a polarizer. In order to solve this problem, a neutral gray polarizing plate using a dye-containing dichromatic colorant as a polarizer has come to be used. In a neutral gray polarizing plate, colorants of three primary colors are generally used in combination in order to improve transmittance in the entire wavelength range of visible light and polarization performance averagely. Thus, there is a problem that to the demand of the marketplace for more brightness as in the color liquid crystal projector, the transmittance is still poor, and in order to realize brightness, it is necessary to increase intensity of the light source. In order to solve this problem, three polarizing plates corresponding to three primary colors, namely, plates for each of the blue channel, the green channel, and the red channel have come to be used.

Decrease in brightness cannot be avoided because light is absorbed considerably by the polarizing plate, and an image of such a small area as 0.5 to 3 inches is magnified to about several tens to one hundred and tens of inches. Therefore, as the light source, one of high luminance is used. Furthermore, desire for further increase in brightness of a liquid crystal projector is strong and, as a result, the intensity of the light source used is inevitably growing stronger. Along with this, the amounts of light and heat which the polarizing film receives are increasing.

Examples of the dyes used for production of the above-mentioned dye-containing polarizing films include water-soluble azo compounds described, for example, in the Patent Document 1 to Patent Document 6.

However, conventional polarizing plates containing the water soluble dyes have not yet satisfied the market needs sufficiently in terms of polarization characteristics, the range of absorption wavelength, hues, and the like. Furthermore, among three polarizing plates corresponding to three primary colors for a color liquid crystal projector, namely, the plates for each of the blue channel, the green channel, and the red channel, none is good in all aspects of brightness, polarization performance, durability under conditions of high temperature and high humidity, and resistance to prolonged irradiation of light. Improvement is thus desired.

Patent Document 1: JP-A-2003-215338
Patent Document 2: JP-A-2004-338876
Patent Document 3: Japanese Patent No. 2,622,748
Patent Document 4: JP-A-60-168743
Patent Document 5: JP-A-2001-33627
Patent Document 6: JP-A-2002-275381
Patent Document 7: JP-A-05-295281
Non-Patent Document 1: "Senryo Kagaku (Dye Chemistry)" written by Yutaka Hosoda

DISCLOSURE OF THE INVENTION

An object of the present invention is to provide a polarizing plate of high performance having excellent polarization performance and resistance to humidity, heat, and light. Further, another object of the present invention is to provide a polarizing plate of high performance which does not cause color leakage at the perpendicular position in the wavelength range of visible light and which has excellent polarization performance and resistance to humidity, heat, and light, the polarizing plate being a neutral color polarizing plate produced by adsorbing two or more dichromatic dyes in a polymer film, followed by orientation thereof.

A further object of the present invention is to provide polarizing plates of high performance corresponding to three primary colors for a color liquid crystal projector, which are good in all of brightness, polarization performance, durability, and light resistance.

The present inventors have conducted intensive studies in order to attain the above objects. As a result, it has been found that a polarizing film and a polarizing plate containing a specific dye have excellent polarizing performance and moisture resistance, heat resistance and light resistance, and thus, the present invention has been accomplished. That is, the constitution of the present invention is as follows.

(1) An azo compound represented by the formula (1) below, a salt thereof or a copper complex salt compound thereof:

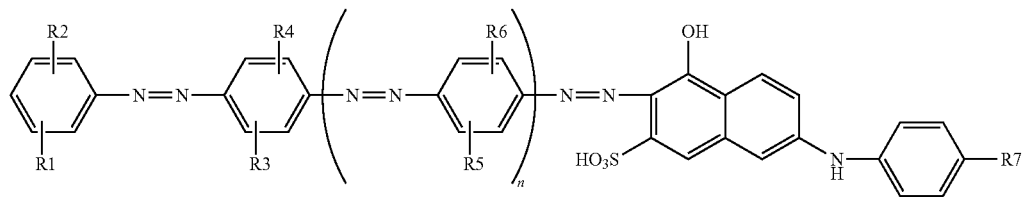

(1)

wherein R1 and R2 each independently represent a hydrogen atom, a sulfonic acid group, a lower alkyl group or a lower alkoxyl group; R3 to R6 each independently represent a hydrogen atom, a lower alkyl group or a lower alkoxyl group; R7 represents a lower alkyl group or a lower alkoxyl group; and n=0 or 1.

(2) The azo compound, a salt thereof or a copper complex salt compound thereof according to (1) wherein R7 is either a methyl group or a methoxy group.

(3) The azo compound, a salt thereof or a copper complex salt compound thereof according to (1) or (2) wherein at least one of R1 and R2 is a sulfonic acid group.

(4) The azo compound, a salt thereof or a copper complex salt compound thereof according to any one of (1) to (3) wherein R1 is at the ortho-position relative to an azo group and R2 is at the para-position relative to an azo group.

(5) The azo compound, a salt thereof or a copper complex salt compound thereof according to any one of (1) to (4) wherein R3 to R6 each independently represent a hydrogen atom, a methyl group or a methoxy group.

(6) A dye-containing polarizing film comprising one or more azo compounds and/or salts thereof or copper complex salt compounds thereof according to any one of (1) to (5) in a polarizing film base material.

(7) A dye-containing polarizing film comprising one or more azo compounds and/or salts thereof or copper complex salt compounds thereof according to any one of (1) to (5) and one or more other organic dyes in a polarizing film base material.

(8) A dye-containing polarizing film comprising two or more azo compounds and/or salts thereof or copper complex salt compounds thereof according to any one of (1) to (5) and one or more other organic dyes in a polarizing film base material.

(9) The dye-containing polarizing film according to any one of (6) to (8) wherein the polarizing film base material is a film comprising a polyvinyl alcohol resin.

(10) A dye-containing polarizing plate comprising a dye-containing polarizing film according to any one of (6) to (9) and a transparent protective film adhered to at least one surface thereof.

(11) A polarizing plate for a liquid crystal display comprising a dye-containing polarizing film or a dye-containing polarizing plate according to any one of (6) to (10).

(12) A color polarizing plate for a liquid crystal projector comprising a dye-containing polarizing film or a dye-containing polarizing plate according to any one of (6) to (10).

The azo compound, the salt thereof or copper complex salt compound thereof of the present invention are useful as a dye for a polarizing film. The polarizing films containing the compound have a high polarizing performance comparable to that of polarizing films which use iodine, and are excellent also in durability. Therefore, they are suitable for various liquid crystal display devices and liquid crystal projectors, uses in vehicles which need high polarizing performance and durability, and display uses of industrial instruments used in various environments.

BEST MODE FOR CARRYING OUT THE INVENTION

The azo compound of the present invention is represented by Formula (1). In Formula (1), R1 and R2 each independently represent a hydrogen atom, a sulfonic acid group, a lower alkyl group or a lower alkoxyl group. As a lower alkyl group, a methyl group, an ethyl group, a propyl group, an iso-propyl group, an n-butyl group, an iso-butyl group and a tert- butyl group can be included. As a lower alkoxyl group, a methoxy group, an ethoxy group, a propoxyl group, an iso-propoxyl group, an n-butoxy group, an iso-butoxy group and a tert-butoxy group can be included. Either one of R1 and R2 is preferably a sulfonic acid group. Further, it is preferable that R1 is at the ortho-position relative to an azo group and R2 is at the para-position relative to an azo group. It is particularly preferable that R1 is a hydrogen atom, a sulfonic acid group, a methyl group or a methoxy group, and R2 is a sulfonic acid group or a methoxy group. R3 to R6 each independently represent a hydrogen atom, a lower alkyl group or a lower alkoxyl group. As R3 to R6, a hydrogen atom, a methyl group and a methoxy group are preferable. R7 represents a lower alkyl group or a lower alkoxy group. As R7, a methyl group and a methoxy group are preferable.

Specific examples of the azo compounds represented by Formula (1) and copper complex salt compounds thereof used in the present invention include the following (formulas (2) to (18)). Here in the following formulas, the sulfonic acid group, carboxyl group and hydroxyl group are represented in free acid forms.

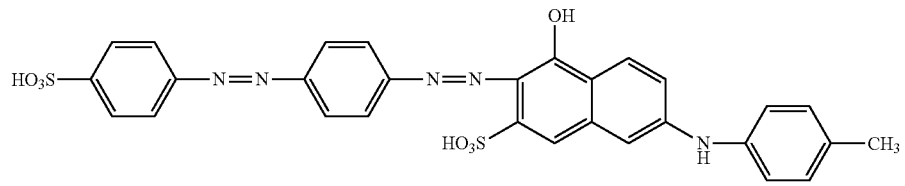
(2)
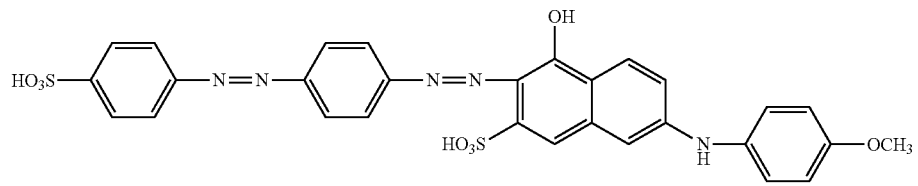
(3)
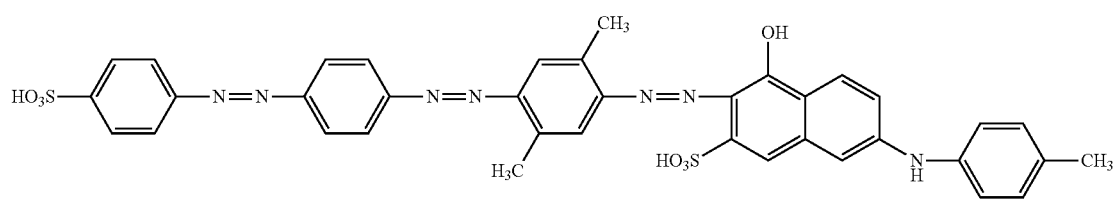
(4)
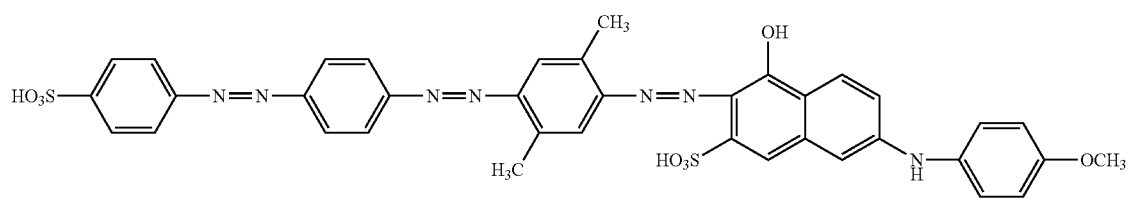
(5)
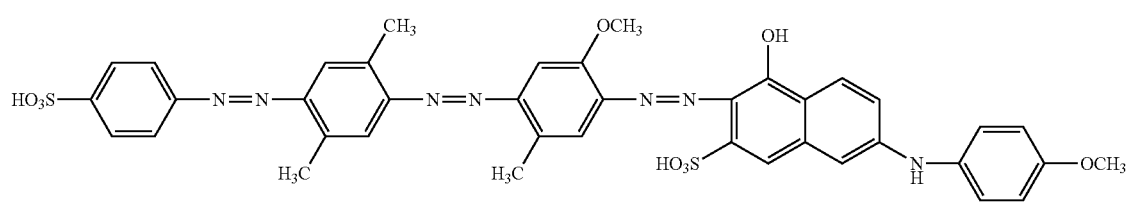
(6)
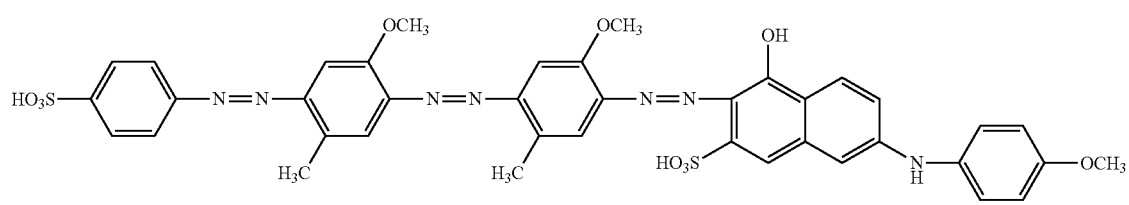
(7)
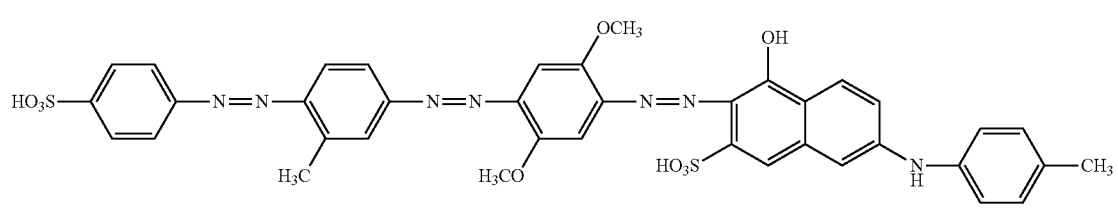
(8)

-continued
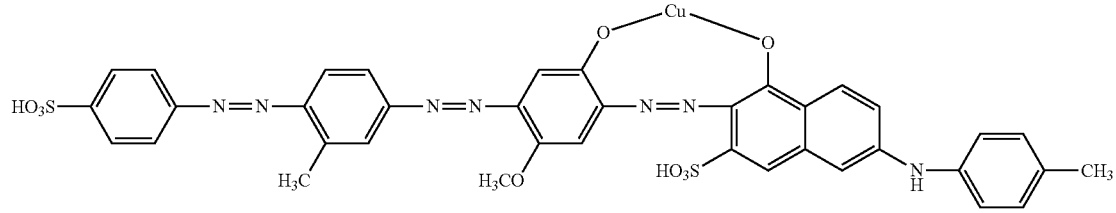
(9)
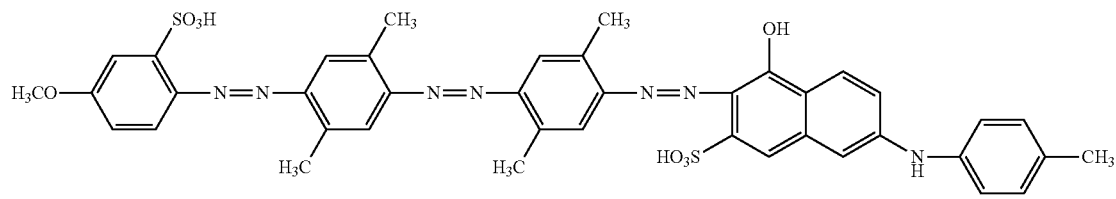
(10)
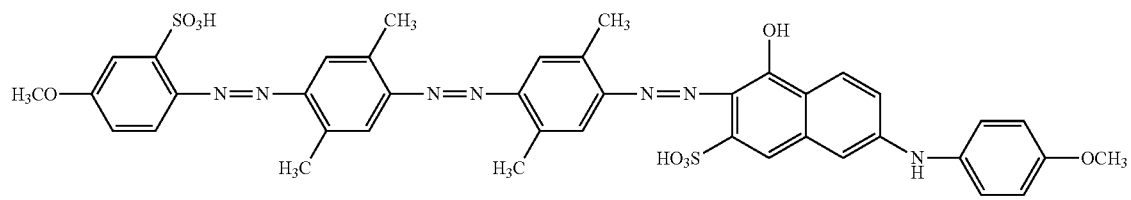
(11)
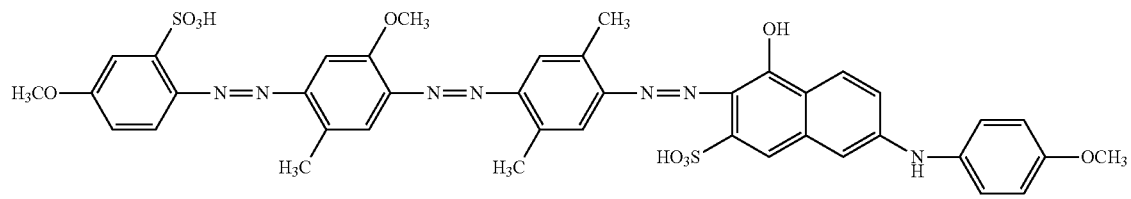
(12)
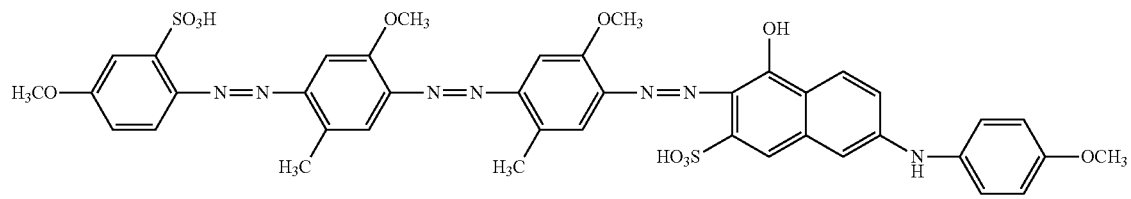
(13)
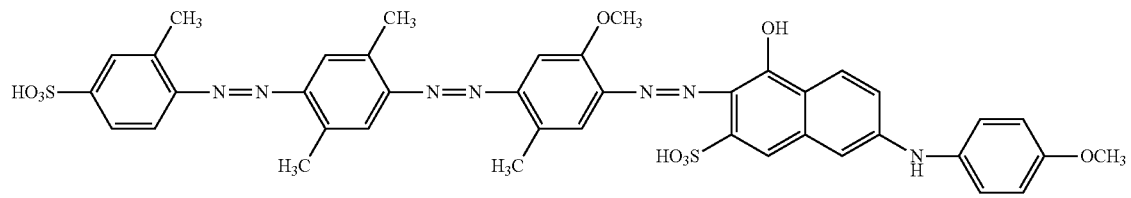
(14)
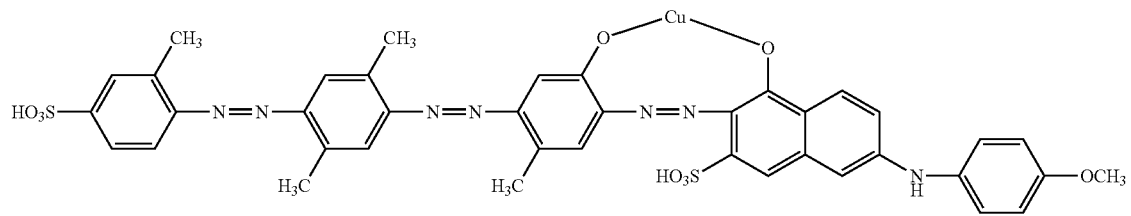
(15)

-continued

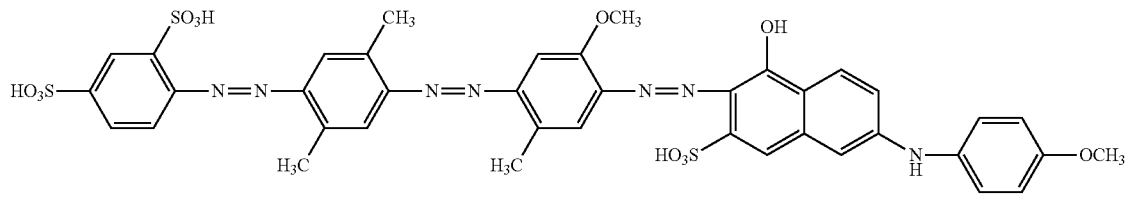

(16)

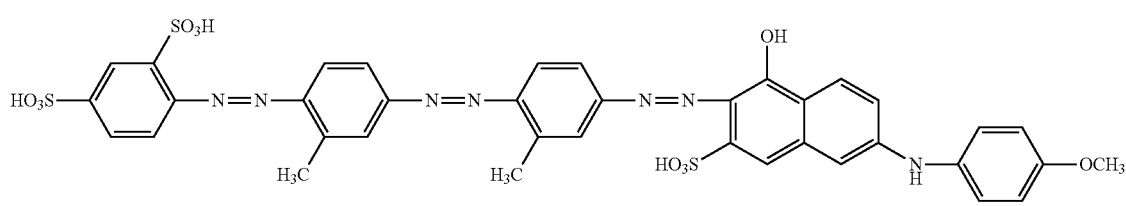

(17)

(18)

The azo compound represented by formula (1) can be easily prepared by carrying out known diazotization and coupling in accordance with a usual process for preparation of azo dyes as described in Non-Patent Document 1. A specific example of the preparation method is shown below: an amino group containing compound represented by the following formula (A) is diazotized and coupled with an aniline represented by the following formula (B) to obtain a monoazo amino compound (following formula (C)).

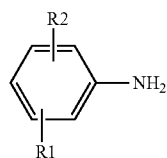

(A)

Wherein, R1 and R2 represent the same meanings as in the formula (1).

(B)

Wherein, R3 and R4 represent the same meanings as in the formula (1).

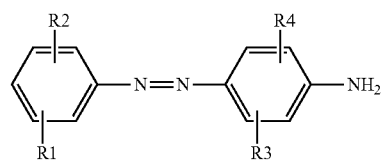

(C)

Subsequently, this monoazo amino compound is diazotized and subjected to a secondary coupling with an aniline represented by the following formula (D) to obtain a disazo amino compound represented by the following formula (E).

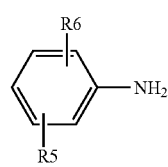

(D)

Wherein, R5 and R6 represent the same meanings as in the formula (1).

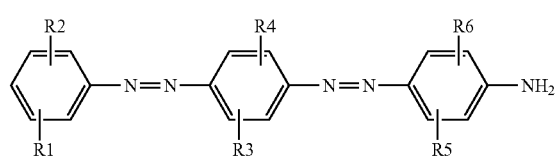

(E)

This disazo amino compound is diazotized and subjected to a third coupling with a naphthol represented by the following formula (F) to obtain an azo compound represented by formula (1).

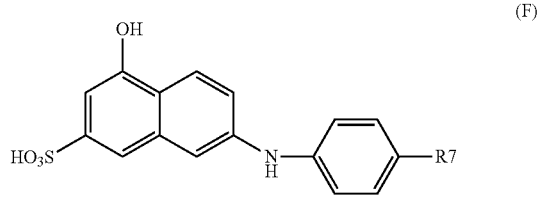

(F)

wherein R7 represents the same meanings as in the formula (1).

In the above reactions, the diazotizing step may be carried out by a sequential method of mixing a nitrite salt such as sodium nitrite with an aqueous solution or suspension of a diazo component in an aqueous mineral acid such as aqueous hydrochloric acid or aqueous sulfuric acid. Alternatively, it may be carried by a reverse method where a nitrite salt is added beforehand to a neutral or weakly alkaline aqueous solution of the diazo component and then the solution is mixed with a mineral acid. The diazotizing temperature is suitably −10° C. to +40° C. The coupling step with an aniline is carried out by mixing an acidic aqueous solution such as aqueous hydrochloric acid, aqueous acetic acid or the like with each of the above diazotized solution and carrying out the coupling at a temperature of −10° C. to +40° C. under an acidic condition of pH 2 to 7.

The monoazo compound and disazo compound obtained by the coupling may be isolated as they are or by separating the compounds by acid precipitation or salting-out, and then filtering off the compound or alternatively, the step may proceed to the next step with the compounds being in the state of solution or suspension. In the case that the diazonium salt is hardly soluble and is in the state of suspension, the suspension can be filtered to obtain a press cake, which is used at the next coupling step.

The third coupling reaction of the diazotized product of the disazoamino compound with the naphthol represented by the formula (F) is carried out at a temperature of −10° C. to +40° C. under a neutral to alkaline condition of pH 7 to 10. After completion of the reaction, the objective product is precipitated by salting-out and isolated by filtration. The copper complex salt compounds can be obtained by further reacting the aqueous solution with a copper salt such as copper sulfate, copper chloride and copper acetate at 80 to 100° C. in the presence of ammonia, monoethanolamine or diethanolamine and performing precipitation operation by salting-out and the like followed by filtration. If purification is required, it can be performed by repeating the salting-out or precipitating the objective product from water using an organic solvent. The organic solvent used for the purification includes water-soluble organic solvents, for example, alcohols such as methanol and ethanol, and ketones such as acetone.

Here as for the azo compound represented by formula (1) in the present invention, it can be used as a free acid, and besides, a salt of the azo compound can be used. Examples of such a salt include alkaline metal salts such as a lithium salt, a sodium salt and a potassium salt, and organic salts such as an ammonium salt and an amine salt. A sodium salt is generally used.

Examples of the amine represented by A which is a starting material used for synthesis of the azo compound, water-soluble dye represented by formula (1) include 4-aminobenzenesulfonic acid, 3-aminobenzenesulfonic acid, 2-aminobenzenesulfonic acid, 2-amino-5-methylbenzenesulfonic acid, 4-amino-2-methylbenzenesulfonic acid, 2-amino-5-methoxy benzenesulfonic acid, 3-amino-4-methoxybenzenesulfonic acid in the case that A is a phenyl group having a substituent group. Of these, 4-aminobenzenesulfonic acid, 2-amino-5-methoxybenzenesulfonic acid or 4-amino-2-methylbenzenesulfonic acid is preferable.

Examples of the substituents in the anilines (formula (B) or (D)) which may have substituents (R3 and R4 or R5 and R6) and are the primary and secondary coupling components include a hydrogen atom, a methyl group, an ethyl group, a methoxy group, an ethoxy group and an acetylamino group. One or two of these substituents may be connected. The bonding position thereof may be 2-position, 3-position, 2-position and 5-position, 3-position and 5-position or 2-position and 6-position in respect to the amino group. 3-Position or 2-position and 5-position is preferable. Examples of the anilines include aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 3,5-dimethylaniline, 2,6-dimethylaniline and 3,5-dimethoxyaniline. In these anilines, the amino group may be protected.

Examples of the protecting group include an ω-methanesulfonic acid group. The anilines used for primary coupling and the anilines used for secondary coupling may be the same or different.

Naphthols represented by formula (F) which is the third coupling component mentioned above are preferably naphthols in which R7 is a methyl group or a methoxy group.

In the dye-containing polarizing film or the dye-containing polarizing plate of the present invention, the azo compound represented by the formula (1) or a salt thereof or a copper complex salt compound thereof may be used singly or in a combination of two or more, and, in addition, if necessary, one or more of other organic dyes may be used in combination. The organic dyes combined are not particularly limited, and are preferably those which have absorption characteristics in a wavelength range different from the absorption wavelength range of the azo compound of the present invention or a salt thereof or a copper complex salt compound thereof and which are high in dichroism. Examples of these organic dyes include C. I. Direct Yellow 12, C. I. Direct Yellow 28, C. I. Direct Yellow 44, C. I. Direct Orange 26, C. I. Direct Orange 39, C. I. Direct Orange 71, C. I. Direct Orange 107, C. I. Direct. Red 2, C. I. Direct. Red 31, C. I. Direct Red 79, C. I. Direct Red 81, C. I. Direct Red 247, C. I. Direct. Green 80, C. I Direct. Green 59 and dyes described in Patent Documents 1 to 4. These dyestuffs are used as free acids, or alkali metal salts (e.g., Na salts, K salts and Li salts), ammonium salts, and salts of amines.

If the other organic dyes are used in combination as necessary, the kind of the dyes added varies depending on the objective polarizing films, namely, depending on whether they are polarizing films of neutral color, color polarizing films for liquid crystal projectors, or other color polarizing films. The amount of the dyes added is not particularly limited, and generally it is preferred to use one or more of the organic dyes in an amount of 0.1 to 10 parts by weight in total based on the weight of the azo compound of formula (1) or a salt thereof or a copper complex salt compound thereof.

The dye-containing polarizing film of the present invention or the polarizing film of the present invention used in polarizing plates for a color liquid crystal projector which has various hues and neutral color can be produced by incorporating the azo compound represented by formula (1) or a salt thereof or a copper complex salt compound thereof, if necessary, together with other organic dyes into a polymer film which is a material of the polarizing film by a known method. The resulting polarizing films are provided with a protective film and can be used as polarizing plates, if necessary, provided with a protective layer or an AR (anti-reflection) layer, and a support or the like. These polarizing plates are used for a liquid crystal projector, an electronic calculator, a watch, a notebook type personal computer, a word processor, a liquid crystal television, a car navigation system, indoor and outdoor measuring instruments or a display, etc.

The base material (polymer film) used for a dye-containing polarizing film of the present invention is suitably a base material comprising polyvinyl alcohol. Examples of the polyvinyl alcohol base material include polyvinyl alcohol or the derivatives thereof and either one of those modified with an olefin such as ethylene and propylene, an unsaturated carboxylic acid such as crotonic acid, acrylic acid, methacrylic acid and maleic acid. Above all, a film comprising polyvinyl alcohol or the derivatives thereof are preferably used from a viewpoint of adsorption of dyes and the orientation. The thickness of the base material is usually about 30 to 100 μm, preferably about 60 to 90 μm.

The azo compound of formula (1) or a salt thereof or a copper complex salt compound thereof can usually be contained in such a polymer film by a method of dyeing a polymer film. The dyeing is carried out, for example, in the following manner. First, the azo compound of the present invention or a salt thereof or a copper complex salt compound thereof, and, if necessary, other dyes are dissolved in water to prepare a dye bath. The concentration of the dye in the dye bath is not particularly limited, and is selected from the range of about 0.001 to 10% by weight. Furthermore, a dyeing auxiliary may be used as required, and, for example, sodium sulfate is suitably used in a concentration of about 0.1 to 10% by weight. The polymer film is dyed by dipping it in the thus prepared dye bath for 1 to 10 minutes. The dyeing temperature is preferably about 40 to 80° C.

Orientation of the water-soluble dye is carried out by stretching the polymer film dyed as mentioned above. As the stretching method, there may be employed any known methods such as wet method and dry method. The stretching of the polymer film may be carried out before dyeing, if necessary. In this case, orientation of the water-soluble dye is performed at the time of the dyeing. If necessary, the polymer film in which the water-soluble dye is contained and orientated is subjected to an after-treatment such as boric acid treatment by a known method. Such after-treatment is carried out for the purpose of improving the light transmittance and polarization degree of the polarizing film. The conditions of the boric acid treatment which vary depending on the kind of the polymer film used and the kind of the dye used. Generally, the treatment is carried out by dipping the polymer film in an aqueous boric acid solution having a boric acid concentration of a range of 0.1 to 15% by weight, preferably 1 to 10% by weight at a temperature range of 30 to 80° C., preferably 40 to 75° C. for 0.5 to 10 minutes. Furthermore, if necessary, a fixing treatment may be carried out in combination with an aqueous solution containing a cationic polymer compound.

To one or both surfaces of the dye-containing polarizing film of the present invention thus obtained a transparent protective film excellent in optical transparency and mechanical strength may be adhered to produce a polarizing plate. As materials constituting the protective film, there are used, for example, in addition to cellulose acetate films and acrylic films, fluorine films such as ethylene tetrafluoride/propylene hexafluoride copolymers, and films comprising a polyester resin, a polyolefin resin or a polyamide resin. The thickness of the protective film is usually 40 to 200 μm.

Examples of the adhesives used for adhering the polarizing film to the protective film include polyvinyl alcohol adhesives, urethane emulsion adhesives, acrylic adhesives, and polyester-isocyanate adhesives. The polyvinyl alcohol adhesives are preferable.

A transparent protective layer may further be provided on the surface of the dye-containing polarizing plate of the present invention. Examples of the protective layer include an acrylic or polysiloxane hard coat layer and a urethane protective layer. In order to further improve single plate average light transmittance, it is preferred to provide an AR layer on the protective layer. The AR layer can be formed, for example, by vapor deposition or sputtering of a material such as silicon dioxide or titanium oxide. It can be also formed by thinly coating a fluorine material. The dye-containing polarizing plate of the present invention can also be used as an elliptically polarizing plate made by adhering a phase difference plate.

The dye-containing polarizing plate of the present invention made as mentioned above has neutral color and has characteristics that it shows no color leakage at the perpendicular position in the wavelength range of the visible light, is excellent in polarizing performance, shows no change of color or deterioration of polarizing performance even under conditions of high temperature and high humidity, and is less in light leakage at the perpendicular position in the range of visible light.

The polarizing plate for a liquid crystal projector in the present invention contains the azo compound represented by formula (1) or a salt thereof or a copper complex salt compound thereof as a dichroic molecule and, if necessary, additionally with the above-mentioned other organic dyes. The polarizing film used in the color polarizing plate for a liquid crystal projector in the present invention is also produced by the method explained above with reference to the production of the dye-containing polarizing film. A protective film is further provided on the polarizing film to make a polarizing plate, and, if necessary, a protective layer or an AR layer and a support, etc. are provided, which is used as a color polarizing plate for a liquid crystal projector.

As a color polarizing plate for a liquid crystal projector, desirably the single plate average light transmittance is 39% or higher and the average light transmittance at the perpendicular position is 0.4% or lower in the wavelength range necessary for the polarizing plate (A: when an ultra-high pressure mercury lamp is used; 420 to 500 nm for blue color channel, 500 to 580 nm for green color channel and 600 to 680 nm for red color channel, B: peak wavelengths when a trichromatic LED lamp is used; 430 to 450 nm for blue color channel, 520 to 535 nm for green color channel and 620 to 635 nm for red color channel). More preferably the single plate average light transmittance is 41% or higher and the average light transmittance at the perpendicular position is 0.3% or lower, more preferably 0.2% or lower in the wavelength range necessary for the polarizing plate. Further preferably, the single plate average light transmittance is 42% or higher and the average light transmittance at the perpendicular position is 0.1% or lower in the wavelength range necessary for the polarizing plate. The color polarizing plate for a liquid crystal projector of the present invention has brightness and excellent polarizing performance as mentioned above.

The color polarizing plate for liquid crystal projectors of the present invention is preferably a polarizing plate with an AR layer mentioned above which is made by providing an AR layer on a polarizing plate consisting of a polarizing film and a protective film. More preferred is a polarizing plate with an AR layer and a support which is made by adhering the polarizing plate with an AR layer to a support such as a transparent glass plate.

The single plate average light transmittance is an average value of light transmittances in a specific wavelength range when a natural light enters one polarizing plate provided with neither AR layer nor support such as a transparent glass plate (hereafter simply referred to as "polarizing plate" in the same sense). The average light transmittance at the perpendicular position is an average value of light transmittances in a specific wavelength range when a natural light enters two polarizing plates disposed with the orientation directions perpendicular to each other.

The color polarizing plate for a liquid crystal projector of the present invention is generally used as a polarizing plate with a support. The support is preferably one which has a flat part because the polarizing plate is adhered to the support. The support is also preferably a molded article of glass because the polarizing plate is for optical use. Examples of the molded articles of glass include a glass plate, a lens, a prism (e.g., triangular prisms, cubic prisms), etc. A lens to which the polarizing plate is adhered can be utilized as a condenser lens with a polarizing plate in the liquid crystal projector. A prism to which the polarizing plate is adhered can be utilized as a polarizing beam splitter with a polarizing plate or as a dichroic prism with a polarizing plate in the liquid crystal projector. Furthermore, the polarizing plate may be adhered to a liquid crystal cell. Examples of the glass materials include inorganic glasses such as soda glass, borosilicate glass and sapphire glass and organic glasses such as acrylic glass and polycarbonate glass. The inorganic glasses are preferred. The thickness and size of the glass plate may be optionally selected. In the case of the polarizing plate with glass, it is preferred to provide an AR layer on one or both of the glass surface and the polarizing plate surface for further improvement of the single plate average light transmittance.

The color polarizing plate with a support for a liquid crystal projector can be produced, for example, by coating a transparent adhesive (pressure sensitive adhesive) on the flat part of the support and then adhering the dye-containing polarizing plate of the present invention to the coated surface. Furthermore, it may also be produced by coating a transparent adhesive (pressure sensitive adhesive) on the polarizing plate and then adhering the support on the coated surface. The adhesive (pressure sensitive adhesive) used here is preferably, for example, of acrylate ester type. In the case of using this polarizing plate as an elliptically polarizing plate, usually the phase difference plate side is adhered to the support side, but the polarizing plate side may be adhered to the molded article of glass.

That is, in the color liquid crystal projector using the dye-containing polarizing plate of the present invention, the dye-containing polarizing plate of the present invention is disposed on one or both of the incident side and the outgoing side of a liquid crystal cell. The polarizing plate may either contact or not with the liquid crystal cell, but preferably it does not contact with the liquid crystal cell from the viewpoint of durability. When the polarizing plate contacts with the liquid crystal cell on the outgoing side, there may be used the dye-containing polarizing plate of the present invention which uses the liquid crystal cell as a support. When the polarizing plate does not contact with the liquid crystal cell, it is preferred to use the dye-containing polarizing plate of the present invention which uses a support other than the liquid crystal cell. From the viewpoint of durability, preferably the dye-containing polarizing plate of the present invention is disposed on both the incident side and the outgoing side of the liquid crystal cell. More preferably the dye-containing polarizing plate of the present invention is disposed in such a manner that the side of the polarizing plate faces the liquid crystal cell and the side of the support faces the light source. The incident side of the liquid crystal cell means the side of light source and the opposite side is called the outgoing side.

In the color liquid crystal projector using the dye-containing polarizing plate of the present invention, it is preferred to dispose an ultraviolet light-cutting filter between the light source and the above polarizing plate with a support which is disposed on the incident side. The liquid crystal cell used is preferably one which is, for example, active matrix type formed by interposing a liquid crystal between a transparent substrate on which an electrode and a TFT are formed and a transparent substrate on which the counter electrode is formed. A light emitted from a light source such as an ultra-high pressure mercury lamp (UHP lamp), a metal halide lamp and a white LED passes through the ultraviolet light-cuttling filter and separates into three primary colors, and thereafter they pass through color polarizing plates with a support for the respective channels of blue color, green color and red color, then are integrated, magnified by a projection lens, and projected on a screen. Alternatively, LEDs or lasers of blue color, green color and red color are used and each light emitted from LEDs or lasers of each colors passes through each of color polarizing plates with a support for the each of channels of blue color, green color and red color, then are integrated, magnified by a projection lens, and projected on a screen.

The color polarizing plate for a liquid crystal projector thus constituted has characteristics that it is excellent in polarizing performance, and shows neither change of color nor deterioration of polarizing performance even under conditions of high temperature and high humidity.

EXAMPLES

Hereinbelow, the present invention will be explained in more detail by way of examples, which are exemplary only and should not be construed as limiting the invention in any manner. All "%" and "parts" in the examples are by weight, unless otherwise notified.

Example 1

27.7 parts of 4-(4'-aminophenyl)-azobenzenesulfonic acid were added to 500 parts of water and dissolved with sodium hydroxide. 32 parts of 35% aqueous hydrochloric acid were added thereto followed by addition of 6.9 parts of sodium nitrite and the mixture was stirred for one hour. Separately, 55 parts of the naphthol compound represented by the following formula (19) were added to 250 parts of a 20% pyridine aqueous solution and dissolved by making weakly alkaline with sodium carbonate. Subsequently, in this solution was introduced the diazotized product of the disazo compound obtained above with keeping the pH at 7 to 10, and the solution was stirred to complete the coupling reaction. Salting-out was carried out with sodium chloride and the precipitate was filtered to obtain 24.7 parts of the trisazo compound represented by the above formula (2). This compound had a reddish violet color and a maximum absorption wavelength at 542 nm in a 20% pyridine aqueous solution.

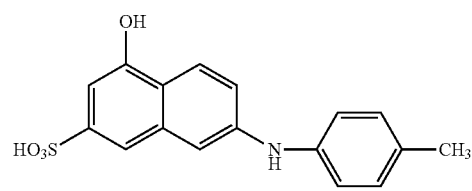

(19)

Example 2

25.3 parts of the compound represented by the above formula (3) were obtained in the same manner as in Example 1, except that the naphthol compound represented by the above formula (19) used in Example 1 was replaced with the compound represented by the following formula (20). This compound had a violet color and a maximum absorption wavelength at 542 nm in a 20% pyridine aqueous solution.

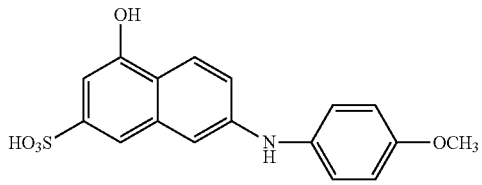

(20)

Example 3

27.7 parts of 4-(4'-aminophenyl)-azobenzenesulfonic acid were added to 500 parts of water and dissolved with sodium hydroxide. 32 parts of 35% aqueous hydrochloric acid were added thereto followed by addition of 6.9 parts of sodium nitrite and the mixture was stirred for one hour. 12.1 parts of 2,5-dimethylaniline dissolved in dilute hydrochloric acid water were added thereto and pH was adjusted to 3 by adding sodium carbonate while stirring at 30 to 40° C. The mixture was further stirred to complete the coupling reaction and 32.8 parts of the disazo compound represented by the following formula (21) were obtained.

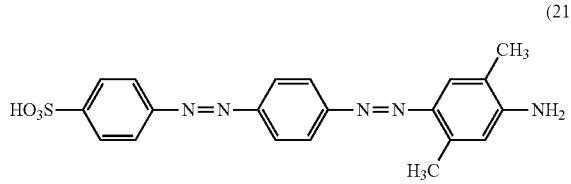

(21)

In 600 parts of water were dispersed 40.9 parts of the disazo compound of the above formula (21), and then thereto were added 32 parts of 35% aqueous hydrochloric acid and then 6.9 parts of sodium nitrite, followed by stirring at 25 to 30° C. for 2 hours to perform diazotization. Separately, 34.5 parts of the naphthol compound represented by the following formula (20) were added to 250 parts of water, and dissolved by making weakly alkaline with sodium carbonate. Subsequently, in this solution was introduced the diazotized product of the disazo compound obtained above with keeping the pH at 7 to 10, and the solution was stirred to complete the coupling reaction. Salting-out was carried out with sodium chloride and the precipitate was filtered to obtain 45 parts of the trisazo compound represented by the above formula (5). This compound had a maximum absorption wavelength at 563 nm in a 20% pyridine aqueous solution.

Example 4

17.3 parts of 4-aminobenzenesulfonic acid were added to 500 parts of water and dissolved with sodium hydroxide. The mixture was cooled and 32 parts of 35% aqueous hydrochloric acid were added thereto followed by addition of 6.9 parts of sodium nitrite at a temperature not higher than 10° C. and the mixture was stirred for one hour at 5 to 10° C. 12.1 parts of 2,5-dimethylaniline dissolved in dilute hydrochloric acid water were added thereto and pH was adjusted to 3 by adding sodium carbonate while stirring at 30 to 40° C. The mixture was further stirred to complete the coupling reaction and a monoazo compound was obtained by filtration. 32 parts of 35% aqueous hydrochloric acid and then 6.9 parts of sodium nitrite were added to the obtained monoazo compound, followed by stirring at 25 to 30° C. for 2 hours. 13.7 parts of 2-methoxy-5-methylaniline dissolved in dilute hydrochloric acid water were added thereto and pH was adjusted to 3 by adding sodium carbonate while stirring at 20 to 30° C. The mixture was further stirred to complete the coupling reaction and 30 parts of the disazo compound represented by the following formula (22) was obtained by filtration.

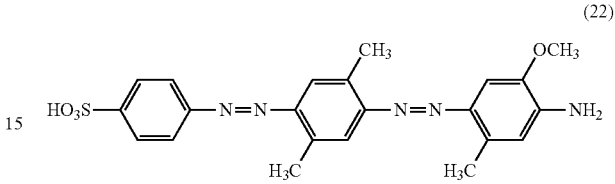

(22)

In 600 parts of water were dispersed 45.3 parts of the disazo compound of the above formula (22), and then thereto were added 32 parts of 35% aqueous hydrochloric acid and then 6.9 parts of sodium nitrite, followed by stirring at 25 to 30° C. for 2 hours to perform diazotization. Separately, 34.5 parts of the naphthol compound represented by the above formula (20) were added to 250 parts of water, and dissolved by making weakly alkaline with sodium carbonate. In this solution was introduced the diazotized product of the disazo compound obtained above with keeping the pH at 7 to 10, and the solution was stirred to complete the coupling reaction. Salting-out was carried out with sodium chloride and the precipitate was filtered to obtain 58 parts of the trisazo compound represented by the above formula (6). This compound had a maximum absorption wavelength at 585 nm in a 20% pyridine aqueous solution.

Example 5

33 parts of the compound represented by the above formula (7) were obtained in the same manner as in Example 4, except that 2,5-dimethylaniline was replaced with 2-methoxy-5-methylaniline as the primary coupler for the compound represented by the above formula (22). This compound had a maximum absorption wavelength at 598 nm in a 20% pyridine aqueous solution.

Example 6

20.3 parts of 2-amino-5-methoxybenzenesulfonic acid were added to 500 parts of water and dissolved with sodium hydroxide. The mixture was cooled and 32 parts of 35% aqueous hydrochloric acid were added thereto followed by addition of 6.9 parts of sodium nitrite at a temperature not higher than 10° C. and the mixture was stirred for one hour at 5 to 10° C. 12.1 parts of 2,5-dimethylaniline dissolved in dilute hydrochloric acid water were added thereto and pH was adjusted to 3 by adding sodium carbonate while stirring at 30 to 40° C. The mixture was further stirred to complete the coupling reaction and a monoazo compound was obtained by filtration. 32 parts of 35% aqueous hydrochloric acid and then 6.9 parts of sodium nitrite were added to the obtained monoazo compound, followed by stirring at 25 to 30° C. for 2 hours. 12.1 parts of 2,5-dimethylaniline dissolved in dilute hydrochloric acid water were added thereto and pH was adjusted to 3 by adding sodium carbonate while stirring at 20 to 30° C. The mixture was further stirred to complete the coupling reaction and 16.8 parts of the disazo compound represented by the following formula (23) was obtained by filtration.

(23)

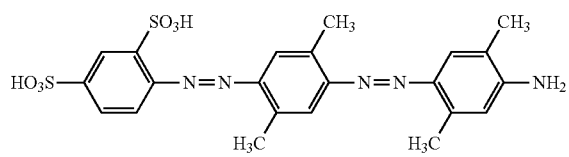

In 600 parts of water were dispersed 16.8 parts of the disazo compound of the above formula (23), and then thereto were added 12 parts of 35% aqueous hydrochloric acid and then 2.5 parts of sodium nitrite, followed by stirring at 25 to 30° C. for 2 hours to perform diazotization. Separately, the naphthol compound represented by the above formula (19) were added to 250 parts of water, and dissolved by making weakly alkaline with sodium carbonate. In this solution was introduced the diazotized product of the disazo compound obtained above with keeping the pH at 7 to 10, and the solution was stirred to complete the coupling reaction. Salting-out was carried out with sodium chloride and the precipitate was filtered to obtain 11.6 parts of the trisazo compound represented by the above formula (10). This compound had a maximum absorption wavelength at 572 nm in a 20% pyridine aqueous solution.

Example 7

11.9 parts of the compound represented by the above formula (11) were obtained in the same manner as in Example 6, except that the naphthol compound represented by the above formula (19) used in Example 6 was replaced with the compound represented by the above formula (20). This compound had a maximum absorption wavelength at 574 nm in a 20% pyridine aqueous solution.

Example 8

24 parts of the trisazo compound represented by the above formula (16) were obtained in the same manner as in Example 4, except that 4-aminobenzenesulfonic acid which was the starting material for the compound represented by the above formula (22) used in Example 4 was replaced with 4-aminobenzene-1,3-disulfonic acid. This compound had a maximum absorption wavelength at 588 nm in a 20% pyridine aqueous solution.

Example 9

27 parts of the compound represented by the above formula (17) were obtained in the same manner as in Example 8, except that 2,5-dimethylaniline and 2-methoxy-5-methylaniline which were the primary coupler and the secondary coupler, respectively, for the compound used in Example 8 were replaced with 3-methylaniline. This compound had a maximum absorption wavelength at 561 nm in a 20% pyridine aqueous solution.

Example 10

25 parts of the compound represented by the above formula (18) were obtained in the same manner as in Example 8, except that 2,5-dimethylaniline and 2-methoxy-5-methylaniline which were the primary coupler and the secondary coupler, respectively, for the compound used in Example 8 were replaced with aniline and 2,5-dimethylaniline. This compound had a maximum absorption wavelength at 575 nm in a 20% pyridine aqueous solution.

Example 11

A polyvinyl alcohol film of 75 μm in thickness was dipped in an aqueous solution containing the compound of the above formula (2) obtained in Example 1 in a concentration of 0.02% and sodium sulfate in a concentration of 0.1% at 45° C. for 4 minutes. This film was stretched fivefold in a 3% aqueous boric acid solution at 50° C., and washed with water and dried with keeping the stretched state to obtain a polarizing film.

The (a) maximum absorption wavelength of the obtained polarizing film was 553 nm; and (b) polarization coefficient was 99.9%. In addition, (C) light resistance (change in the polarization coefficient before and after irradiation) was 5.44%. That is, it has been found that the film was superior to Comparative Example 1 shown below even in the light resistance when exposed to light for a long time. In addition, long-term durability was shown in a condition which is both in high temperature and high humidity. The test methods for the above characteristics (a) to (c) are described below.

(a) Measurement of Maximum Absorption Wavelength (λmax) of Polarizing Film

Two pieces of the polarizing films obtained above were superposed one upon another so that the orientation directions are perpendicular to each other (perpendicular position), and in this state the maximum absorption wavelength was measured using a spectrophotometer (U-4100 manufactured by Hitachi, Ltd.).

(b) Measurement of Polarization Coefficient

Transmittance at parallel position (Tp) and transmittance at perpendicular position (Tc) were measured using the above spectrophotometer. The polarization coefficient was calculated by the formula: Polarization coefficient=$[(Tp-Tc)/(Tp+Tc)]^{1/2} \times 100 (\%)$.

(c) Light Resistance (Change in Polarization Coefficient Before and After Irradiation)

The polarizing film was irradiated with light for 576 hours using an accelerated xenon arc fade meter (manufactured by Wacom Co., Ltd.), and the polarization coefficient after irradiation was obtained by the method described in (b), and the change in the polarization coefficient before and after irradiation was calculated by the formula: Change in polarization coefficient before and after irradiation=(polarization coefficient before irradiation−polarization coefficient after irradiation)/polarization coefficient before irradiation×100(%).

Examples 12 to 20

Polarizing films were obtained in the same manner as in Example 11 except that the azo compounds of the above formulas (3), (5) to (7), (10), (11) and (16) to (18) were used in place of the compound of the above formula (2). The maximum absorption wavelength and the polarization coefficient of the obtained polarizing films are shown in Table 1. The polarizing film prepared with these compounds had high polarization coefficient as shown in Table 1. As shown in Tables 2 to 4, it was also found that the polarizing films prepared with the azo compounds of the above formulas (2), (3), (5), (10), (11) and (16) were superior to Comparative Examples 1 to 4 shown below in light resistance in long-term exposure. In addition, these polarizing films exhibited durability for a long period of time even under conditions of high temperature and high humidity

TABLE 1

Maximum Absorption Wavelength and Polarization Coefficient of Polarizing Films

| | Salt of azo compound | Maximum absorption wavelength (nm) | Polarization coefficient |
|---|---|---|---|
| Example 12 | Compound of the above formula (3) | 557 | 99.9% |
| Example 13 | Compound of the above formula (5) | 592 | 99.9% |
| Example 14 | Compound of the above formula (6) | 607 | 99.9% |
| Example 15 | Compound of the above formula (7) | 617 | 99.9% |
| Example 16 | Compound of the above formula (10) | 580 | 99.9% |
| Example 17 | Compound of the above formula (11) | 585 | 99.9% |
| Example 18 | Compound of the above formula (16) | 606 | 99.9% |
| Example 19 | Compound of the above formula (17) | 575 | 99.9% |

TABLE 1-continued

Maximum Absorption Wavelength and Polarization Coefficient of Polarizing Films

| | Salt of azo compound | Maximum absorption wavelength (nm) | Polarization coefficient |
|---|---|---|---|
| Example 20 | Compound of the above formula (18) | 589 | 99.9% |

Comparative Example 1

A polarizing film was prepared in the same manner as in Example 11, except that the compound of the structure of the following formula (24) described in Example 1 of Patent Document 1 was used in place of the compound of the above formula (2) obtained in Example 1. The polarizing film was irradiated with light for 576 hours using an accelerated xenon arc fade meter manufactured by Wacom Co., Ltd. Change in polarization coefficient before and after irradiation of light was 12.29%, which corresponded to light resistance not higher than ½ of the polarizing films prepared with the compounds of the formulas (2) and (3) in Examples 11 and 12.

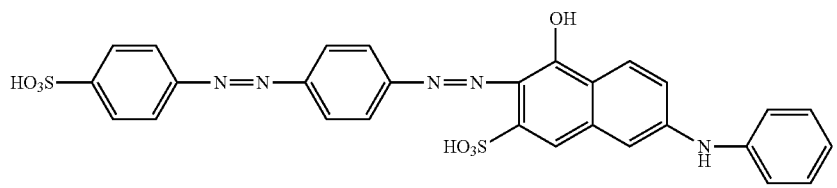

(24)

TABLE 2

Change in Polarization Coefficient Before and After Irradiation (1)

| | Salt of azo compound | Change in Polarization coefficient |
|---|---|---|
| Example 11 | Compound of the above formula (2) | 5.44% |
| Example 12 | Compound of the above formula (3) | 2.34% |
| Comparative Example 1 | Compound of the above formula (17) | 12.29% |

Comparative Examples 2 and 3

A polarizing film was prepared in the same manner as in Example 13, except that the compounds of the structures of the following formula (25) described in Example 1 of Patent Document 7 and the following formula (26) described in Example 1 of Patent Document 3 were used in place of the compound of the above formula (5) obtained in Example 13. The polarizing film was irradiated with light for 720 hours using an accelerated xenon arc fade meter manufactured by Wacom Co., Ltd. Change in polarization coefficient before and after irradiation of light was as shown in Table 3, which corresponded to light resistance not higher than ½ of the polarizing film prepared with the compound of the formula (5) in Example 13.

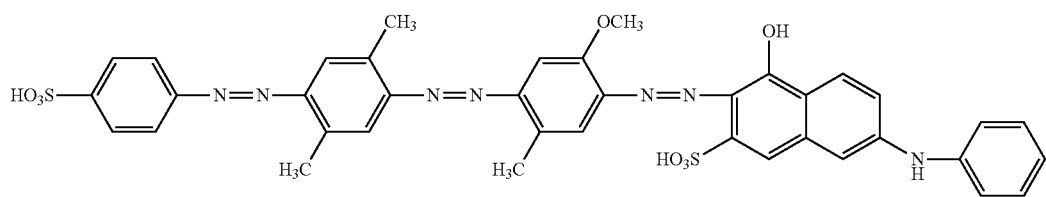
(25)

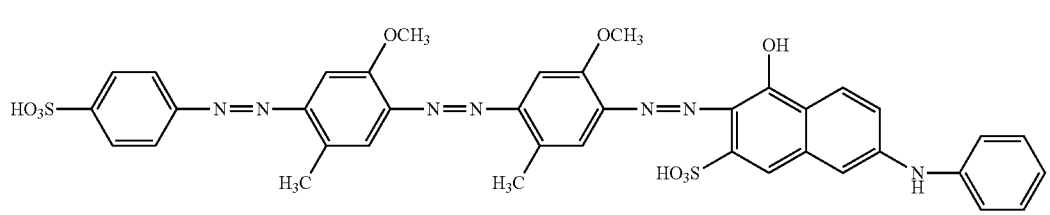
(26)

TABLE 3

Change in Polarization Coefficient Before and After Irradiation (2)

| | Salt of azo compound | Change in Polarization coefficient |
|---|---|---|
| Example 13 | Compound of the above formula (5) | 1.23% |
| Comparative Example 2 | Compound of the above formula (25) | 2.85% |
| Comparative Example 3 | Compound of the above formula (26) | 6.90% |

TABLE 4

Change in Polarization Coefficient Before and After Irradiation (3)

| | Salt of azo compound | Change in Polarization coefficient |
|---|---|---|
| Example 16 | Compound of the above formula (10) | 0.48% |
| Example 17 | Compound of the above formula (11) | 0.33% |
| Example 18 | Compound of the above formula (16) | 0.49% |
| Comparative Example 4 | Compound of the above formula (27) | 1.27% |

Comparative Example 4

A polarizing film was prepared in the same manner as in Example 16, except that the compound of the structures of the following formula (27) described in Example 1 of Patent Document 2 was used in place of the compound of the above formula (10) obtained in Example 16. The polarizing film was irradiated with light for 720 hours using an accelerated xenon arc fade meter manufactured by Wacom Co., Ltd. Change in polarization coefficient before and after irradiation of light was as shown in Table 4, which corresponded to light resistance not higher than ½ of the polarizing films prepared with the compounds of the formulas (10), (11) and (16) in Examples 16 to 18.

Example 21

A polyvinyl alcohol film of 75 μm in thickness was dipped in an aqueous solution containing the compound of the above formula (5) obtained in Example 3 in a concentration of 0.04%, C.I. Direct Red 81 in a concentration of 0.04%, C.I. Direct Orange 39 in a concentration of 0.03%, a compound represented by the structure of the following formula (28) described in Example 23 of Patent Document 4 in a concentration of 0.03% and sodium sulfate in a concentration of 0.1% at 45° C. for 4 minutes. This film was stretched fivefold in a 3% aqueous boric acid solution at 50° C., and washed

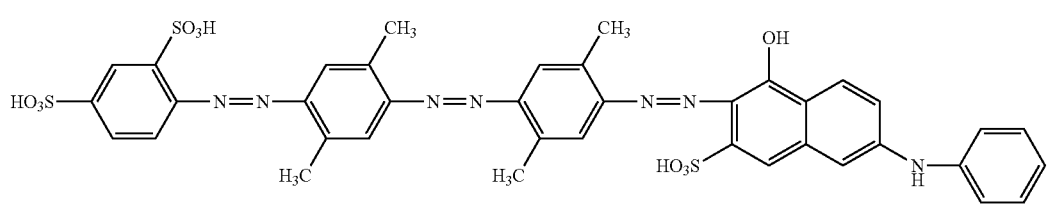
(27)

with water and dried with keeping the stretched state to obtain a polarizing film of neutral color (grey at parallel position and black at perpendicular position). The resulting polarizing film had a single plate average light transmittance of 41% and an average light transmittance at the perpendicular position of 0.1% or lower, and had a high polarization coefficient. Furthermore, it had durability for a long period of time even under conditions of high temperature and high humidity.

0.03%, and exhibited higher durability as compared with Comparative Example 5 shown below.

Comparative Example 5

A polarizing plate was obtained in the same manner as in Example 22 except that an aqueous solution of 45° C. containing the compound of formula (27) shown in Comparative

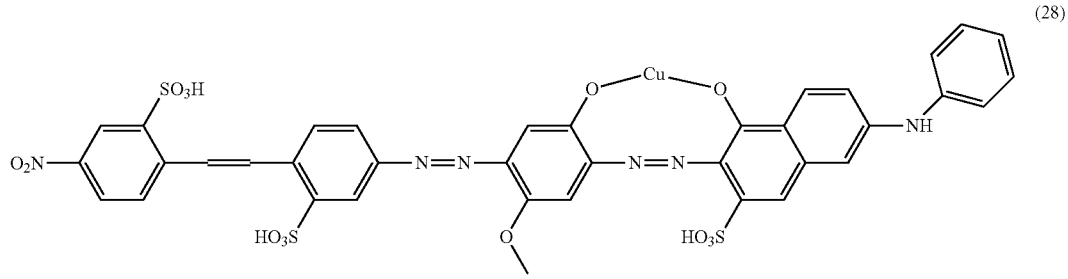

(28)

Example 22

A polyvinyl alcohol film of 75 μm in thickness was dipped in an aqueous solution containing the compound of the above formula (11) obtained in Example 7 in concentration of 0.05% and C.I. Direct Orange 39 in a concentration of 0.1% at 45° C. for 4.5 minutes. This film was stretched fivefold in a 3% aqueous boric acid solution at 50° C., and washed with water and dried with keeping the stretched state to obtain a polarizing film. A TAC film (thickness: 80 μm, trade name: TD-80U manufactured by Fuji Photo Film Co., Ltd.) was adhered on one surface of the resulting polarizing film with a PVA adhesive, and the TAC film having a UV (ultraviolet ray) curing hard coat layer of about 10 μm in thickness formed on side thereof was adhered on another surface of the resulting polarizing film with a PVA adhesive to obtain a dye-containing polarizing plate of the present invention. An acrylate ester type pressure sensitive adhesive was applied to one side of the polarizing plate to obtain a polarizing plate with a pressure sensitive adhesive layer. Furthermore the outer side of the hard coat layer was subjected to AR (anti-reflection) multi-coating treatment by vacuum deposition. This polarizing plate was cut to a size of 30 mm×40 mm and adhered on a glass plate of the same size having a transparent AR layer on one side to obtain a color polarizing plate with an AR support (for green color channel for liquid crystal projectors) of the present invention. The color polarizing plate of this Example for a liquid crystal projector had a maximum absorption wavelength (λmax) at 570 nm, a single plate average light transmittance at 500 to 580 nm of 44.1% and an average light transmittance at the perpendicular position of 0.02%, and a high polarization coefficient. In addition, the polarizing plate showed durability over a long period of time even under conditions of high temperature and high humidity. As for this polarizing plate, after a light emitted from a 200W UHP lamp (ultra-high pressure mercury lamp) used as a light source of a projector was introduced to PBS (Polarizing Beam Splitter) so as to uniform the polarization light, the light in the wavelength of 495 to 595 nm was selectively taken out therefrom, and this polarizing plate was positioned at a configuration to absorb the light. Change in polarization coefficient before and after irradiation for 823 hours (Change in polarization coefficient (%)=polarization coefficient before irradiation (%)-polarization coefficient after irradiation (%)) at 570 nm was Example 4 in a concentration of 0.05% and C.I. Direct Orange 39 in a concentration of 0.08% was used in place of an aqueous solution of 45° C. containing the compound of the above formula (11) obtained in Example 7 in a concentration of 0.05% and C.I. Direct Orange 39 in a concentration of 0.1%. As for this polarizing plate, after a light emitted from a 200W UHP lamp (ultra-high pressure mercury lamp) used as a light source of projectors was introduced to PBS (Polarizing Beam Splitter) so as to uniform the polarization light, the light in the wavelength of 495 to 595 nm was selectively taken out therefrom, and this polarizing plate was positioned at a configuration to absorb the light in the same way as in Example 22. Change in polarization ratio before and after irradiation for 823 hours at 570 nm was 0.12%, which was inferior in light resistance compared to Example 22.

INDUSTRIAL APPLICABILITY

The azo compound, a salt thereof or a copper complex salt compound thereof of the present invention are useful as a material for polarizing films. The polarizing films containing these compounds are suitable for various liquid crystal display devices and liquid crystal projectors, specifically, uses in vehicles and display uses of industrial instruments used in various environments.

The invention claimed is:

1. An azo compound represented by the formula (1) below, a salt thereof or a copper complex salt compound thereof:

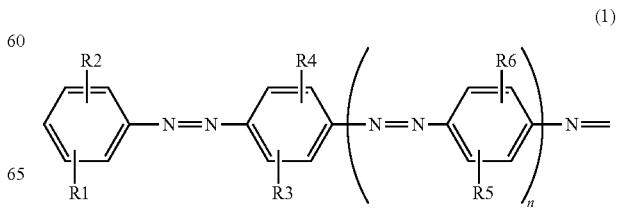

(1)

-continued

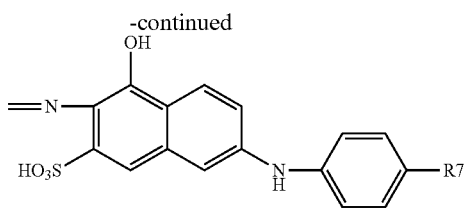

wherein R1 and R2 each independently represent a hydrogen atom, a sulfonic acid group, a lower alkyl group or a lower alkoxyl group; R3 to R6 each independently represent a hydrogen atom, a lower alkyl group or a lower alkoxyl group; R7 represents a lower alkyl group or a lower alkoxyl group; and n=1.

2. The azo compound, a salt thereof or a copper complex salt compound thereof according to claim 1, wherein R7 is either a methyl group or a methoxy group.

3. The azo compound, a salt thereof or a copper complex salt compound thereof according to claim 1, wherein at least one of R1 and R2 is a sulfonic acid group.

4. The azo compound, a salt thereof or a copper complex salt compound thereof according to claim 1, wherein R1 is at an ortho-position relative to an azo group and R2 is at a para-position relative to an azo group.

5. The azo compound, a salt thereof or a copper complex salt compound thereof according to claim 1, wherein R3 to R6 each independently represent a hydrogen atom, a methyl group or a methoxy group.

6. The azo compound, a salt thereof or copper complex salt compound thereof according to claim 1, wherein R1 is at the ortho-position relative to the azo group; R2 is at the para-position relative to the azo group; at least one of R1 and R2 is a sulfonic acid group; R3 to R6 each independently represents a hydrogen atom, a methyl group or methoxy group; and R7 is either a methyl group or a methoxy group.

7. A dye-containing polarizing film comprising one or more azo compounds and/or salts thereof or copper complex salt compounds thereof according to claim 1 in a polarizing film base material.

8. A dye-containing polarizing film comprising one or more azo compounds and/or salts thereof or copper complex salt compounds thereof according to claim 1 and one or more other organic dyes in a polarizing film base material.

9. A dye-containing polarizing film comprising two or more azo compounds and/or salts thereof or copper complex salt compounds thereof according to claim 1 and one or more other organic dyes in a polarizing film base material.

10. The dye-containing polarizing film according to any one of claims 7 to 9 wherein the polarizing film base material is a film comprising a polyvinyl alcohol resin.

11. A dye-containing polarizing plate comprising a dye-containing polarizing film according to claim 10 and a transparent protective film adhered to at least one surface thereof.

12. A polarizing plate for a liquid crystal display comprising a dye-containing polarizing plate according to claim 11.

13. A color polarizing plate for a liquid crystal projector comprising a dye-containing polarizing plate according to claim 11.

* * * * *